United States Patent
Segawa et al.

(10) Patent No.: US 12,018,790 B2
(45) Date of Patent: Jun. 25, 2024

(54) HEAT INSULATOR

(71) Applicant: PANASONIC CORPORATION, Osaka (JP)

(72) Inventors: Terutsugu Segawa, Osaka (JP); Masayuki Umeda, Hokkaido (JP)

(73) Assignee: PANASONIC HOLDINGS CORPORATION, Osaka (JP)

( * ) Notice: Subject to any disclaimer, the term of this patent is extended or adjusted under 35 U.S.C. 154(b) by 885 days.

(21) Appl. No.: 16/124,020

(22) Filed: Sep. 6, 2018

(65) Prior Publication Data

US 2019/0072227 A1    Mar. 7, 2019

(30) Foreign Application Priority Data

Sep. 6, 2017 (JP) .................................. 2017-171485
Jun. 7, 2018 (JP) .................................. 2018-109393

(51) Int. Cl.
    *F16L 59/02*      (2006.01)
    *F16L 59/06*      (2006.01)
    *F16L 59/07*      (2006.01)

(52) U.S. Cl.
CPC ............ *F16L 59/028* (2013.01); *F16L 59/026* (2013.01); *F16L 59/029* (2013.01); *F16L 59/06* (2013.01); *F16L 59/07* (2013.01)

(58) Field of Classification Search
CPC ..... F16L 59/028; F16L 59/026; F16L 59/029; F16L 59/00; B32B 5/02; B32B 2307/304
See application file for complete search history.

(56) References Cited

U.S. PATENT DOCUMENTS

2002/0094426 A1* 7/2002 Stepanian ............ B01J 13/0091
                                                         428/292.1
2008/0063942 A1* 3/2008 Okuno .................. H01M 4/747
                                                         429/232

(Continued)

FOREIGN PATENT DOCUMENTS

CN          105008786 A      10/2015
JP          2009-299893 A      12/2009

(Continued)

OTHER PUBLICATIONS

"Silica Aerogel" American Elements. (Year: 2022).*
English translation of Search Report dated Mar. 4, 2020 for the corresponding Chinese Patent Application No. 201811030649.2.

*Primary Examiner* — Jenna N Chandhok
(74) *Attorney, Agent, or Firm* — Rimon P.C.

(57) ABSTRACT

A heat insulator is disclosed which simplifies processes of measures for preventing contamination of a surrounding caused by falling off of a silica aerogel in a silica-aerogel support heat insulator. In the silica-aerogel support heat insulator, a support layer whose melting point is lower than a melting point of a fiber supporting the silica aerogel is used, and by performing thermal-pressure bonding at a temperature lower than the melting point of the fiber but higher than the melting point of the support layer to cause the support layer to enter the fiber to combine the support layer and the fiber. Thus, processes of measures for preventing contamination of a surrounding caused by falling off of the silica aerogel can be simplified, and use in a large size and/or in a complicated shape is made possible.

13 Claims, 6 Drawing Sheets

(56) References Cited

U.S. PATENT DOCUMENTS

| | | | |
|---|---|---|---|
| 2015/0017860 A1* | 1/2015 | Bullock | ................ B32B 5/245 442/221 |
| 2016/0003404 A1 | 1/2016 | Shibata et al. | |
| 2016/0167340 A1 | 6/2016 | Nakamura et al. | |
| 2018/0031304 A1 | 2/2018 | Kal et al. | |

FOREIGN PATENT DOCUMENTS

| | | |
|---|---|---|
| JP | 2016-112757 A | 6/2016 |
| JP | 2017-015205 A | 1/2017 |
| KR | 2016-0098049 A | 8/2016 |

\* cited by examiner

HEAT INSULATOR

CROSS REFERENCE TO RELATED APPLICATIONS

This application is entitled to and claims the benefit of Japanese Patent Application No. 2018-109393, filed on Jun. 7, 2018, and Japanese Patent Application No. 2017-171485, filed on Sep. 6, 2017, the disclosure of which Applications including the specification, drawings and abstract are incorporated herein by reference in its entirety.

TECHNICAL FIELD

The present invention relates to a heat insulator.

BACKGROUND ART

In recent years, the density of heat from heat generating components has been rapidly increasing along with an increase in performance of electronic devices and/or precision equipment, such as smartphones, tablets, and/or notebook computers. Thus, thermal diffusion techniques for these electronic devices have become indispensable.

Particularly, small mobile devices often come into direct contact with human bodies, and a temperature rise in outer surfaces of bodies of the mobile devices becomes a serious problem. As a problem caused by a temperature rise in the outer surfaces of bodies of the mobile devices, a low-temperature burn can be cited. A low-temperature burn is a type of burn which occurs when a human body is exposed to a temperature higher than the body temperature for a long time. For example, there is a report indicating that exposure at 44° C. for 6 hours causes a burn, and each time the temperature rises 1° C., the time causing a burn is reduced to half. As to low temperature burns, people become aware of progression of symptoms later time in most cases as compared with an ordinary burn, and by the time a person becomes aware of the progression of symptom, the skin already has serious damage in many cases.

Meanwhile, the following problems are present in cold devices. For example, in refrigerators, urethane foam and/or a vacuum heat insulator is used for preventing heat entry into a refrigerator from a wall surface of the refrigerator, and a seal structure using a gasket and/or the like is used between a door and a box-body of the refrigerator. Meanwhile, since the inside of the refrigerator is maintained at a low temperature, so that the temperature of the front surface of the refrigerator becomes lower than the temperature at the outside of the refrigerator, which may possibly cause dew condensation. For this reason, a tube through which a high temperature refrigerant flows or a heater needs to be disposed near the front surface of the refrigerator, and this heat adversely enters the inside of the refrigerator via components forming the refrigerator.

In both cases of electronic devices and cold devices, disposing a heat insulator makes it possible to prevent a low temperature burn in case of electronic devices and to suppress cooling power for heat entry in case of cold devices. In these cases, the installable space is very small, so that a heat insulator which is thin and has low thermal conductivity is needed.

In the current situation as described above, there is a silica-aerogel sheet as a heat insulator which brings about sufficient heat insulating effects even in small spaces. This silica-aerogel sheet is obtained by causing a nonwoven fabric to support a silica aerogel having a nano-sized porous structure.

A silica aerogel is an aggregate of mesh structures provided with silica secondary particles 502 and voids 503 as illustrated in FIG. 5. Silica secondary particles 502 are each formed by aggregation of silica primary particles 501 each of which has a diameter of about 1 nm, and silica secondary particle 502 has a diameter of about 10 nm. Voids 503 each have an inter-particle distance of about 10 to 60 nm.

The inter-particle distance is not greater than the mean free path of air (nitrogen molecule). For this reason, the thermal conductivity of a silica aerogel is 0.015 to 0.024 W/mK, and it is very low. This thermal conductivity is not greater than the thermal conductivity (0.026 W/mK) of still air at ordinary temperature. Thus, stacking an aerogel sheet having low thermal conductivity makes it possible to suppress heat transfer.

Silica-aerogel sheets (nonwoven fabric in which silica aerogels each having a nano-sized porous structure are supported), however, have a small binding force between silica secondary particles 502, and are very fragile. For this reason, when stress is added from an outside to the silica-aerogel sheet, a silica aerogel piece (e.g., having a size of 100 μm to 200 μm) which exists in an opening of a surface of the silica-aerogel sheet is detached in the electronic device.

Further, the silica aerogel piece detached in the electronic device is in a state not supported by the nonwoven fabric which eases the stress from the outside. For this reason, the detached silica aerogel piece is pulverized into fine powder of a large amount of silica particles and dispersed in the electronic device, thus causing a failure, such as loose connection.

Thus, it is necessary to suppress detachment of a silica aerogel when the stress from the outside is added to one surface or both surfaces of a silica-aerogel sheet.

In this respect, for example, Patent Literature (hereinafter, referred to as "PTL") 1 discloses a method for forming heat insulator 601 by forming a part where no silica aerogels 602 exist in nonwoven fabric 603, and thermally pressure bonding this part and support layers 604a and 604b as illustrated in FIG. 6.

Further, PTL 2, for example, discloses a method for suppressing detachment of a silica aerogel by causing a silica aerogel not to be supported in a nonwoven fabric surface layer, and thermally fusion bonding the nonwoven fabric surface layer to make an opening diameter of the nonwoven fabric surface layer to be smaller than the diameter of a silica aerogel.

CITATION LIST

Patent Literatures

PTL 1
   Japanese Patent Application Laid-Open No. 2016-112757
PTL 2
   Japanese Patent Application Laid-Open No. 2017-15205

SUMMARY OF INVENTION

Technical Problem

With the methods of PTLs 1 and 2, however, when causing silica aerogels to be supported in a nonwoven fabric, masking or adjustment of the immersion into a chemical solution is required, and support for an increase in size (larger area) and/or for a complicated shape become difficult.

In applications including a cold device, for example, a region where heat insulation is desired is often a location isolated from an electronic device. For this reason, there is almost no impact of detachment of part of silica aerogels, and there is no problem even when a silica aerogel is exposed from and detached from an end surface of a nonwoven fabric resulting from cutting.

The present invention is to solve the problem in the related art described above and thus aims at providing a heat insulator making it possible to support an increase in size and/or to support a complicated shape.

Solution to Problem

To achieve the above object, a heat insulator of the present invention includes: a fiber layer in which a silica aerogel is supported; and at least one support layer disposed on or above at least one surface of the fiber layer, in which the heat insulator further includes a combined layer resulting from the at least one support layer combined with the fiber layer by entering of the at least one support layer into the fiber layer.

Advantageous Effects of Invention

According to a heat insulator of the present invention, a heat insulator making it possible to achieve an increase in size and to support a complicated shape can be provided.

DESCRIPTION OF EMBODIMENTS

Hereinafter, a description will be given of each embodiment of the present invention with reference to the accompanying drawings. Note that, the present invention is not limited by the following embodiments.

Embodiment 1

Embodiment 1 of the present invention will be described using FIGS. 1A and 1B and FIGS. 2A, 2B, and 2C.

Figure 1A:
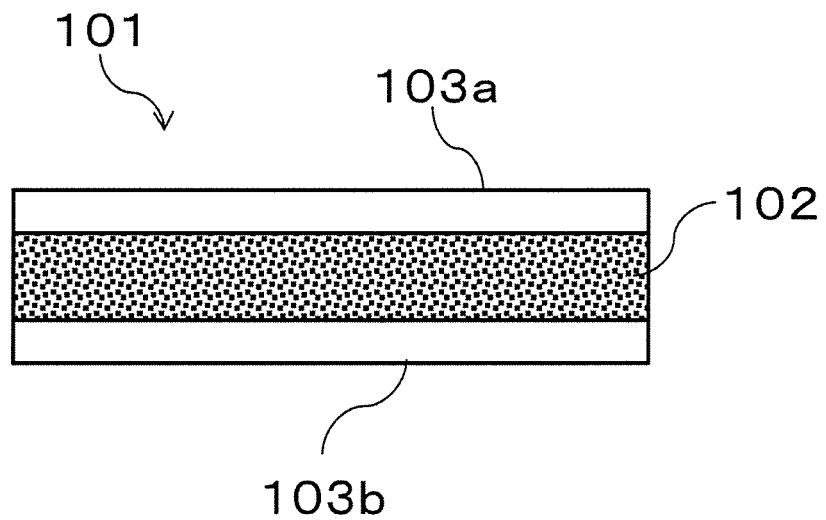
FIG. 1A is a sectional view of a side surface of a heat insulator in Embodiment 1 of the present invention.

FIG. 1A is a sectional view of a side surface of heat insulator 101 in Embodiment 1. As illustrated in FIG. 1A, in heat insulator 101, one surface of silica-aerogel support fiber 102 is covered by support layer 103a, and a rear surface of silica-aerogel support fiber 102 is covered by support layer 103b.

Silica-aerogel support fiber 102 (exemplary fiber layer) is a nonwoven fabric in which silica aerogels are supported. The silica aerogels are supported over the entire surface and in the whole thickness direction of silica-aerogel support fiber 102.

Figure 1B:
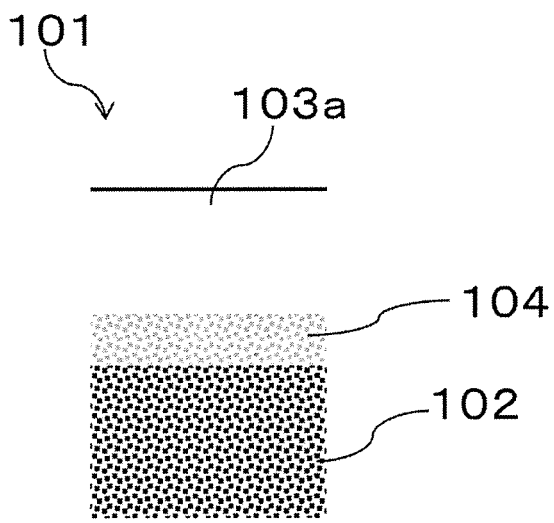
FIG. 1B is an enlarged view of a welded part of the heat insulator in Embodiment 1 of the present invention.

FIG. 1B is an enlarged view of a welded part of the heat insulator in Embodiment 1. As illustrated in FIG. 1B, a part of support layer 103a is integrated into silica-aerogel support fiber 102 between support layer 103a and silica-aerogel support fiber 102. Thus, combined layer 104 of support layer 103a and silica-aerogel support fiber 102 is Ruined. Note that, a similar combined layer is formed also between support layer 103b and silica-aerogel support fiber 102.

In Embodiment 1, the thickness of silica-aerogel support fiber 102 is 1 mm, the thicknesses of support layers 103a and 103b are 60 µm, and the thickness of combined layer 104 is 20 µm, for example. Moreover, the thickness of a combined layer (not illustrated) of support layer 103b and silica-aerogel support fiber 102 is also 20 µm.

Support layers 103a and 103b herein are formed from a material (substance) whose melting point is lower than a fabric forming silica-aerogel support fiber 102. As a material forming support layers 103a and 103b, polyethylene (melting point of 115 to 135° C.) can be used, for example. As a fiber forming silica-aerogel support fiber 102, polyester (melting point of 255 to 260° C.) can be used, for example. Note that, as to selecting of a material forming support layers 103a and 103b and silica-aerogel support fiber 102, the material is not limited to those mentioned above, and a variety of materials can be selected.

In Embodiment 1, a description will be given, as an example, of a case where support layers 103a and 103b are composed of a polyethylene sheet and the thickness of the polyethylene sheet is 60 µm, but the thickness is not limited to this value. When the thickness of the polyethylene sheet is equal to or greater than 40 µm, combined layer 104 illustrated in FIG. 1B can be formed. Note that, when the thickness of the polyethylene sheet is less than 40 µm, since support layers 103a and 103b penetrate into silica-aerogel support fiber 102 as mentioned above, the thickness of support layers 103a and 103b may become small, and a hole may be generated in the surface of heat insulator 101.

Meanwhile, when the thickness of support layers 103a and 103b is too large, the flexibility as heat insulator 101 may decrease, and/or the proportion of the thickness of support layers 103a and 103b in the thickness of the entirety of heat insulator 101 may become large, and this may cause higher thermal conductivity as heat insulator 101. For these reasons, the thickness of support layers 103a and 103b is preferably equal to or less than 100 μm.

Figure 2A:
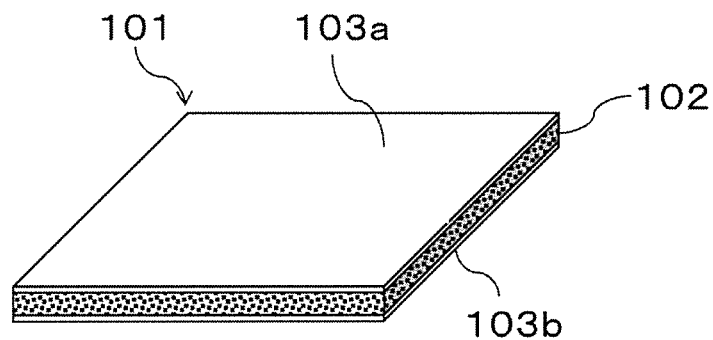
FIG. 2A is a perspective view of the heat insulator after thermal welding of a nonwoven fabric and a support layer in Embodiment 1 of the present invention.

As a shape of the entirety of heat insulator 101, the shape illustrated in FIG. 2A can be cited as an example. FIG. 2A illustrates heat insulator 101 in which support layers 103a and 103b and silica-aerogel support fiber 102 are combined and of which an upper surface and lower surface have a rectangular shape (in other words, the entire shape is a rectangular solid).

In heat insulator 101 illustrated in FIG. 2A, support layers 103a and 103b and silica-aerogel support fiber 102 are combined by a combined layer (not illustrated) and they are combined in a homogeneous manner. For this reason, even when heat insulator 101 is cut in any direction on the plane of heat insulator 101, the state where support layers 103a and 103b and silica-aerogel support fiber 102 have been combined is maintained. The planar portion of silica-aerogel support fiber 102 has a structure covered by support layers 103a and 103b. Moreover, since no welding is applied between support layers 103a and 103b, end surfaces resulting from the cut are in a state where silica-aerogel support fiber 102 (and silica aerogel) is exposed.

Figure 2B:
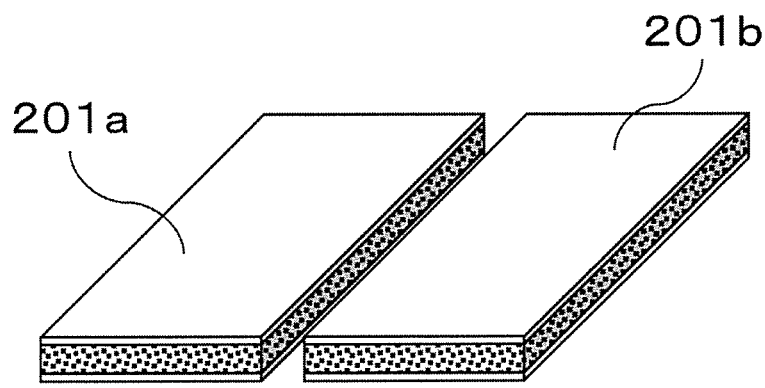
FIG. 2B is a schematic view of a cut shape after the thermal welding of the nonwoven fabric and the support layer in Embodiment 1 of the present invention.
Figure 2C:
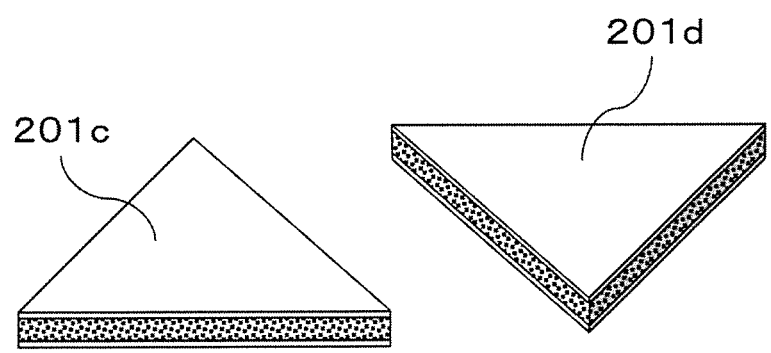
FIG. 2C is a schematic view of a cut shape after the thermal welding of the nonwoven fabric and the support layer in Embodiment 1 of the present invention.

FIG. 2B and FIG. 2C are each a schematic diagram illustrating a cut shape in a case where heat insulator 101 is cut after the thermal welding of support layers 103a and 103b and silica-aerogel support fiber 102.

FIG. 2B illustrates a state where one heat insulator 101 (see, e.g., FIG. 1A), which is a rectangular solid, is cut and thus divided into two heat insulators 201a and 201b of the same rectangular solid. Heat insulators 201a and 201b are usable as a heat insulator without any change, as in the case of heat insulator 101 before cutting.

FIG. 2C illustrates a state where one heat insulator 101 (e.g., see FIG. 1A), which is a rectangular solid, is cut and thus divided into two heat insulators 201c and 201d having the same triangular prism. Heat insulators 201a and 201b are usable as a heat insulator without any change, as in the case of heat insulator 101 before cutting.

As a cutting means, it is possible to use edged tools, such as a cutter, and a press configuration, such as Thompson type. More specifically, since a cutting means not requiring heating can be used, heat insulator 101 can be easily cut into any shape.

<Formation Method of Combined Layer 104>

A formation method of combined layer 104 illustrated in FIG. 1B will be described, herein.

Combined layer 104 is formed by pressurization while heating at a temperature which is higher than a melting point of support layer 103a but lower than a melting point of a fiber forming silica-aerogel support fiber 102.

For example, pressure is applied between two heated rollers and a laminated body in which silica-aerogel support fiber 102 is held between support layers 103a and 103b is caused to pass through between the two rollers. As described above, in Embodiment 1, polyethylene (melting point of 115 to 135° C.) is used as a material for support layers 103a and 103b, and polyester (melting point of 255 to 260° C.) is used as a fiber of silica-aerogel support fiber 102. Therefore, combined layer 104 can be formed by causing the laminated body to pass through between the rollers five times to perform heating and pressurization, while setting the heating temperature to 150° C., the pressurization pressure to 40 MPa, and the speed to 50 mm/s.

The thickness of combined layer 104 is adjustable by the heating temperature and pressurization pressure. The thickness of combined layer 104 becomes larger as the heating temperature and pressurization pressure become higher, and the thickness of combined layer 104 becomes smaller as the heating temperature and pressurization pressure become lower.

The combination strength of support layers 103a and 103b and silica-aerogel support fiber 102 becomes higher as the thickness of combined layer 104 becomes larger. However, the amount of penetration of support layers 103a and 103b into silica-aerogel support fiber 102 (thickness of combined layer 104) increases, so that the thermal conductivity as heat insulator 101 becomes high.

Meanwhile, the combination strength of support layers 103a and 103b and silica-aerogel support fiber 102 becomes lower, as the thickness of combined layer 104 becomes smaller. However, since the amount of penetration of support layers 103a and 103b into silica-aerogel support fiber 102 (thickness of combined layer 104) decreases, the thickness of the materials of support layers 103a and 103b can be reduced. Thus, the thickness of heat insulator 101 as a whole can be reduced.

In Embodiment 1, combined layer 104 is formed by the conditions and method mentioned above. As a result, the combination strength of support layer 103a and silica-aerogel support fiber 102 in heat insulator 101 indicates that the load for separation in a right angle direction with 300 mm/min in heat insulator 101 having a width of 15 mm becomes equal to or greater than 3N. Further, the increase of thermal conductivity is suppressed to be less than 10%.

Note that, the heating conditions and pressurizing conditions described above are only exemplary, and it is possible to form combined layer 104 in the same manner as described above even when other conditions are selected. However, change may be needed depending on a material to be used. Furthermore, although a description has been given with an example in which two heated rollers are used as a means for heating and pressurizing in Embodiment 1, the means for heating and pressurizing is not limited to the means described above, and another means, such as heating and pressurizing using an impulse sealer, may be used.

Effects of Embodiment 1

As has been described above, according to heat insulator 101 of Embodiment 1, in a use environment where no impact is caused by falling off of a silica aerogel from a fiber side surface, a heat insulator can be created in a larger size, and the heat insulator can be cut into a required shape after being created in a larger size. Therefore, it is made possible to use heat insulator 101 in a larger size or a complicated shape in electronic devices, precision equipment, cold equipment, and/or the like, for example.

As mentioned above, although it is necessary to take measures for preventing contamination of a surrounding caused by falling off of a silica aerogel, processing of the measures can be simplified with heat insulator 101 of Embodiment 1.

Embodiment 2

Embodiment 2 of the present invention will be described using FIG. 3A, FIG. 3B, FIG. 3C, and FIG. 3D. Note that, a configuration that is different from that of Embodiment 1 will be mainly described in the description of Embodiment 2, hereinafter. In FIGS. 3A to 3D, the same reference numerals are given to the same components as Embodiment 1, and their descriptions are omitted.

Figure 3A:
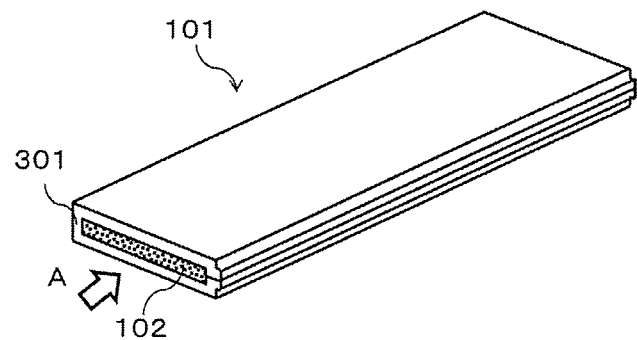
FIG. 3A is a perspective view of a heat insulator in Embodiment 2 of the present invention.

FIG. 3A is a perspective view of heat insulator 101 in Embodiment 2. As illustrated in FIG. 3A, support layer 301 wraps silica-aerogel support fiber 102. A surface of heat insulator 101 as viewed from the direction of arrow A illustrated in FIG. 3A is an example of the exposed surface where silica-aerogel support fiber 102 and the silica aerogel are exposed.

Figure 3B:
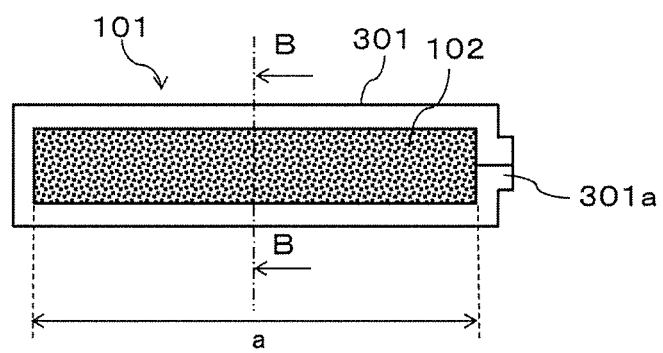
FIG. 3B is a diagram of the heat insulator as viewed from a direction of arrow A of FIG. 3A.

FIG. 3B is a diagram of heat insulator 101 of FIG. 3A as viewed from the direction of arrow A. As illustrated in FIG. 3B, support layer 301 is thermally welded at support layer welding part 301a corresponding to one side surface of silica-aerogel support fiber 102 to seal the side surface of silica-aerogel support fiber 102. Support layer welding part 301a is a portion where two support layers are welded together (i.e., a portion where the end portions of the support layers are welded together).

Figure 3C:
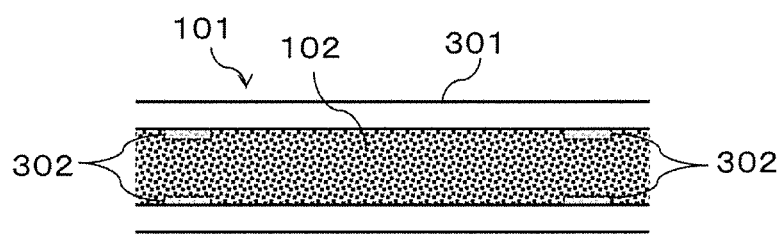
FIG. 3C is a sectional view taken along line B-B of FIG. 3B.

FIG. 3C is a sectional view taken along line B-B of FIG. 3B. As illustrated in FIG. 3C, heat insulator 101 includes combined layer 302 of support layer 301 and silica-aerogel support fiber 102. Combined layer 302 herein is not disposed on the entire surface of heat insulator 101 (silica-aerogel support fiber 102), but is disposed in a depth direction in FIG. 3C. In other words, combined layer 302 is disposed in the full length (range indicated by both arrows a in FIG. 3B) of silica-aerogel support fiber 102. As a result, heat insulator 101 is protected in periphery by support layer welding part 301a and combined layer 302 and is thus structurally hard. The width (the length of the horizontal direction in the drawing) of combined layer 302 illustrated in FIG. 3C is 10 mm, for example.

As illustrated in FIG. 3C, combined layer 302 exists in a part of an interface between silica-aerogel support fiber 102 and support layer 301.

Figure 3D:
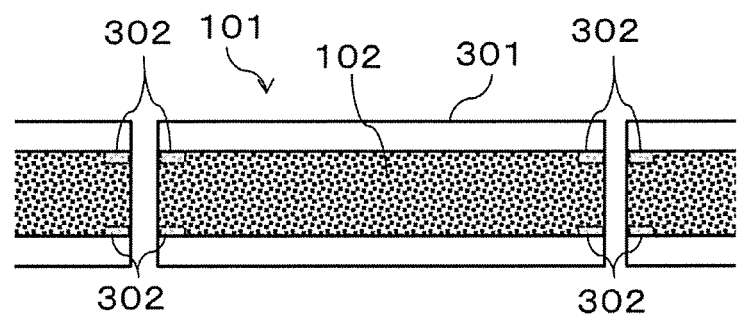
FIG. 3D is a sectional view after cutting of the heat insulator in Embodiment 2 of the present invention.

Heat insulator 101 is cut into an optional shape after formation of combined layer 302. FIG. 3D is a sectional view after cutting of heat insulator 101 illustrated in FIGS. 3A to 3C (after cutting along the width direction of heat insulator 101). As illustrated in FIG. 3D, heat insulator 101 is cut at a part where combined layer 302 of support layer 301 and silica-aerogel support fiber 102 exists. Heat insulator 101 herein is cut at the center of the width of combined layer 302 as an example. As a result, combined layer 302 after cutting has a width of 5 mm. As described herein, by cutting at a part where combined layer 302 exists, the combination of support layer 301 and silica-aerogel support fiber 102 is maintained. Thus, heat insulator 101 after cutting becomes usable as a heat insulator covered by support layer 301 as in the case of heat insulator 101 before cutting.

Furthermore, as illustrated in FIG. 3D, combined layer 302 exists in the exposed surface In addition, as illustrated in FIG. 3D, combined layer 302 is present from the exposed surface to have a constant length toward the inside of heat insulator 101 (i.e., along the longitudinal direction of heat insulator 101 from the exposed surface). The constant length is a length not greater than a thickness of heat insulator 101. Further, as illustrated in FIG. 3D, all or part of combined layer 302 faces the exposed surface.

Support layer 301 herein uses a material whose melting point is lower than a melting point of the fiber forming silica-aerogel support fiber 102. In Embodiment 2, for example, polyethylene (melting point of 115 to 135° C.) can be used as a material forming support layer 301. Moreover, as a fiber forming silica-aerogel support fiber 102, polyester (melting point of 255 to 260° C.) can be used. Note that, as to the selecting of a material forming support layer 301 and silica-aerogel support fiber 102, the material is not limited to the above and a variety of materials are selectable.

<Formation Method of Combined Layer 302>

A description will be herein given of a formation method of combined layer 302 illustrated in FIG. 3C.

Combined layer 302 is formed by pressurization while heating at a temperature which is higher than a melting point of support layer 103a but lower than a melting point of a fiber forming silica-aerogel support fiber 102.

Support layer 301 and silica-aerogel support fiber 102 are subjected to heating under pressurization, using an impulse sealer, for example. As described above, in Embodiment 2, polyethylene (melting point of 115 to 135° C.) is used as a material which forms support layer 301, and polyester (melting point of 255 to 260° C.) is used as a fiber which forms silica-aerogel support fiber 102. Thus, pressurization and heating are performed to form combined layer 302 while the heating temperature is set to 180° C. and the pressurization pressure is set to 20 MPa.

The heating conditions and pressurization conditions described above are only exemplary, and even when another condition is selected, it is possible to form combined layer 302 as described above. However, change may be needed depending on a material to be used. Moreover, although a description has been given, as an example, of the case where an impulse sealer is used as the means for heating and pressurizing in Embodiment 2, the means for heating and pressurizing is not limited to this case, and another means may be used.

Effects of Embodiment 2

As described above, according to heat insulator 101 of Embodiment 2, the effects of Embodiment 1 mentioned above can be obtained. Further, according to heat insulator 101 of Embodiment 2, formation of combined layer 302 does not have to be performed on the entire surface of heat insulator 101, and the configuration of pressurization equipment can be simplified.

Embodiment 3

Embodiment 3 of the present invention will be described using FIG. 4A, FIG. 4B, FIG. 4C, and FIG. 4D. Note that, a description will be mainly given of a configuration that is different from that of Embodiment 2, in the description of Embodiment 3. In FIGS. 4A to 4D, the same reference numerals are given to the same components as Embodiment 2, and their descriptions are omitted.

Figure 4A:
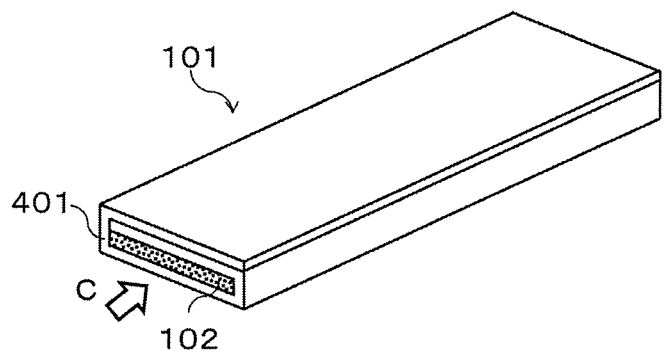
FIG. 4A is a perspective view of a heat insulator in Embodiment 3 of the present invention.

FIG. 4A is a perspective view of heat insulator 101 in Embodiment 3. As illustrated in FIG. 4A, support layer 401 wraps silica-aerogel support fiber 102. The surface of heat insulator 101 as viewed from the direction of arrow C illustrated in FIG. 4A is an exemplary exposed surface where silica-aerogel support fiber 102 and the silica aerogel are exposed.

Figure 4B:
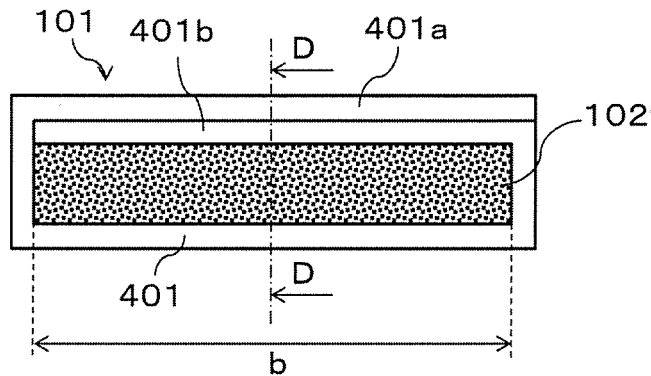
FIG. 4B is a diagram of the heat insulator as viewed from a direction of arrow C of FIG. 4A.

FIG. 4B is a diagram of heat insulator 101 of FIG. 4A as viewed from the direction of arrow C. As illustrated in FIG. 4B, support layer 401a and support layer 401b in support layer 401 are stacked on an upper surface of silica-aerogel support fiber 102. Support layer 401a and support layer 401b are welded together, and seal two side surfaces of silica-aerogel support fiber 102. As described herein, in Embodiment 3, the welded part in support layer 401 becomes a flat surface, and is located on the upper surface side or lower surface side of heat insulator 101. Note that, support layer 401a and support layer 401b may also be called a "welded part."

Figure 4C:
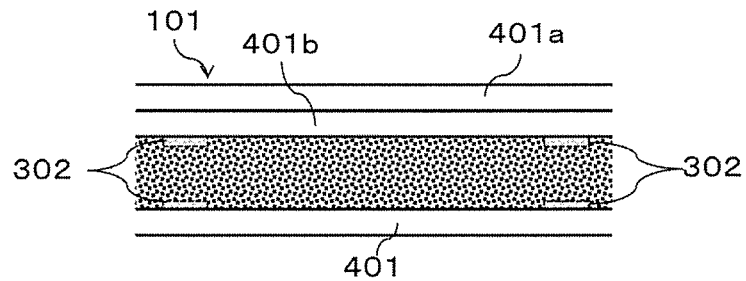
FIG. 4C is a sectional view taken along line D-D of FIG. 4B.

FIG. 4C is a sectional view taken along line D-D of FIG. 4B. As illustrated in FIG. 4C, heat insulator 101 includes combined layer 302 of support layer 401 and silica-aerogel support fiber 102. Combined layer 302 herein is not disposed on the entire surface of heat insulator 101 (silica-aerogel support fiber 102), but is disposed in a depth direction in FIG. 4C. In other words, combined layer 302 is disposed in the full length of a width direction of silica-aerogel support fiber 102 (range indicated by both arrows b illustrated in FIG. 4B). The width (the length of the horizontal direction in the drawing) of combined layer 302 illustrated in FIG. 4C is 10 mm, for example.

As illustrated in FIG. 4C, combined layer 302 exists in a part of an interface between silica-aerogel support fiber 102 and support layer 401 (support layer 401b).

Figure 4D:
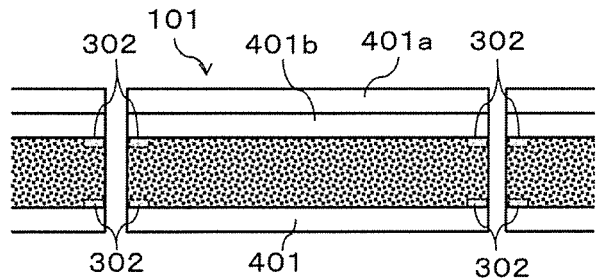
FIG. 4D is a sectional view after cutting of the heat insulator in Embodiment 2 of the present invention.
Figure 5:
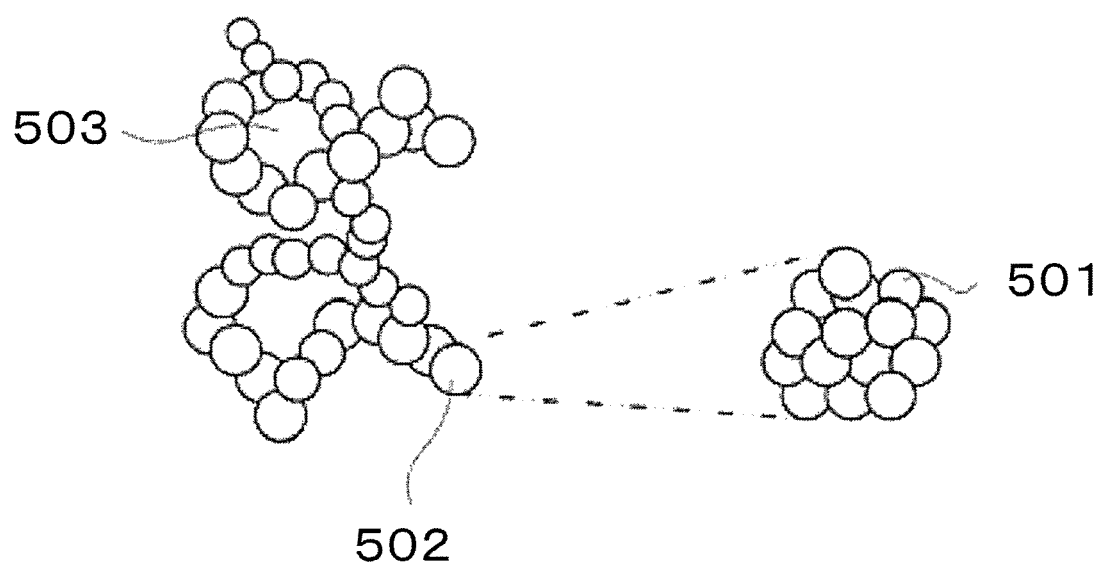
FIG. 5 is a schematic view of a partially enlarged silica aerogel.
Figure 6:
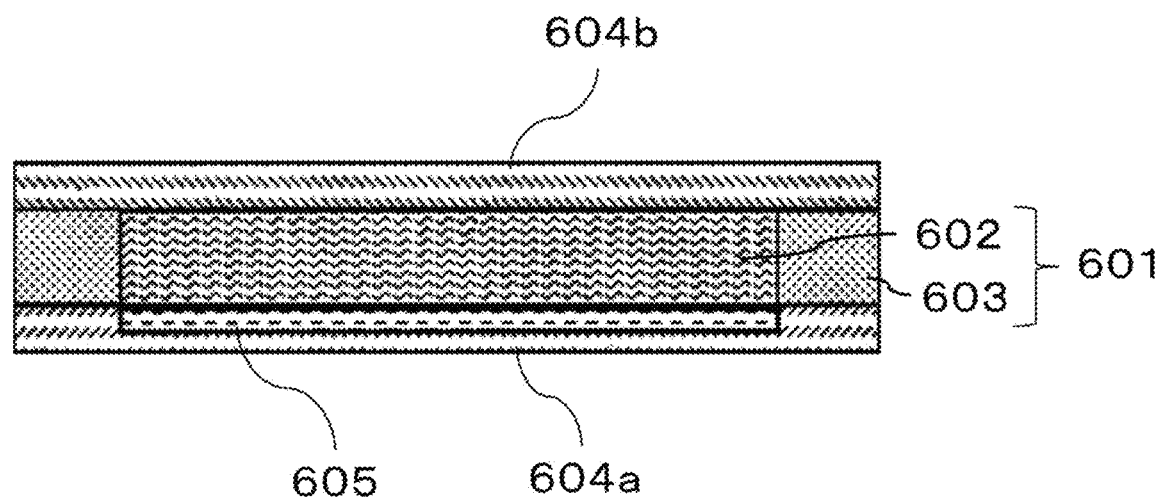
FIG. 6 is a sectional view of a side surface of a traditional heat insulator.

FIG. 4D is a sectional view after cutting of heat insulator 101 illustrated in FIG. 4A to FIG. 4C (after cutting along the width direction of heat insulator 101). As illustrated in FIG. 4D, heat insulator 101 is cut at a part where combined layer 302 of support layer 401 and silica-aerogel support fiber 102 exists. Heat insulator 101 herein is cut at the center of the width of combined layer 302 as an example. As a result, combined layer 302 after cutting has a width of 5 mm. As described herein, by cutting at a part where combined layer 302 exists, the combination of support layer 401 and silica-aerogel support fiber 102 is maintained. Thus, heat insulator 101 after cutting becomes usable as a heat insulator covered by support layer 401 as in the case of heat insulator 101 before cutting.

Furthermore, as illustrated in FIG. 4D, combined layer 302 exists in the exposed surface In addition, as illustrated in FIG. 4D, combined layer 302 is present from the exposed surface to have a constant length toward the inside of heat insulator 101 (i.e., along the longitudinal direction of heat insulator 101 from the exposed surface). The constant length is a length not greater than a thickness of heat insulator 101. Further, as illustrated in FIG. 4D, all or part of combined layer 302 faces the exposed surface.

Effects of Embodiment 3

As described above, according to heat insulator 101 of Embodiment 3, the effects of Embodiment 1 mentioned above can be obtained. More particularly, use in a long shape in electronic devices, precision instruments, or cold devices is made possible, for example.

<Summary of the Disclosure>

A heat insulator of the present disclosure includes: a fiber layer in which a silica aerogel is supported; and at least one support layer disposed on at least one surface of the fiber layer, in which the heat insulator further comprises a combined layer resulting from the at least one support layer combined with the fiber layer by entering of the at least one support layer into the fiber layer.

In the heat insulator of the present disclosure, a melting point of the at least one support layer may be lower than a melting point of the fiber layer.

In the heat insulator of the present disclosure, an exposed surface where the fiber layer and the silica aerogel are exposed exists in at least one surface in an end portion of the heat insulator in a planar direction.

In the heat insulator of the present disclosure, the combined layer exists in a part of an interface between the fiber layer and the at least one support layer.

In the heat insulator of the present disclosure, the combined layer exists in the exposed surface.

In the heat insulator of the present disclosure, the combined layer exists with a constant length extending from the exposed surface toward an inside of the heat insulator.

In the heat insulator of the present disclosure, the constant length is a length not greater than a thickness of the heat insulator.

In the heat insulator of the present disclosure, all or part of the combined layer faces the exposed surface.

In the heat insulator of the present disclosure, the at least one support layer includes a plurality of the supported layers, one of which wraps the fiber layer and which includes a welded portion where end portions of the one of the plurality of support layers are welded together.

In the heat insulator of the present disclosure, the one of the plurality of support layers wraps the fiber layer and is stacked on one surface of the fiber layer, and includes a welded portion where the stacked support layers are welded together.

In the heat insulator of the present disclosure, the welded layer and the combined layer exist around the heat insulator.

INDUSTRIAL APPLICABILITY

A heat insulator of the present invention can simplify processes of measures for preventing contamination of a surrounding caused by falling off of a silica aerogel and can increase in size and is usable in a complicated shape. The heat insulator of the present invention is applicable not only to heat insulation of electronic devices, such as mobile devices, but also to heat insulation of large devices, such as cold devices.

REFERENCE SIGNS LIST 101, 601 Heat insulator
102, Silica-aerogel support fiber
103a, 103b, 301, 401, 401a, 401b, 604a, 604b Support layer
104, 302 Combined layer
201a, 201b, 201c, 201d Heat insulator after cutting
301a Support layer welding part
501 Silica primary particle
502 Silica secondary particle
503 Void
602 Silica aerogel
603 Nonwoven fabric
605 Graphite sheet

The invention claimed is:
1. A heat insulator, comprising:
a fiber layer comprising a nonwoven fabric and silica aerogels, the nonwoven fabric being formed from fibers, the silica aerogels being supported by the nonwoven fabric and existing throughout the nonwoven fabric;
at least one support layer comprising polyethylene having a melting point lower than a melting point of the fibers, and disposed on or above at least one surface of the fiber layer; and
a combined layer resulting from the at least one support layer welded with the fiber layer, wherein a part of the polyethylene is integrated into the fiber layer and penetrates between the fibers of the nonwoven fabric, wherein the combined layer is not disposed on an entire area between the fiber layer and the at least one support layer, but is disposed in a partial area between the fiber layer and the at least one support layer.

2. The heat insulator according to claim 1, wherein the heat insulator has an exposed surface where the fiber layer is exposed from the at least one support layer at an end portion of the heat insulator in a planar direction.

3. The heat insulator according to claim 1, wherein the combined layer exists in a part of an interface between the fiber layer and the at least one support layer.

4. The heat insulator according to claim 2, wherein the combined layer exists in the exposed surface.

5. The heat insulator according to claim 4,
wherein the combined layer exists in a part of an interface between the fiber layer and the at least one support layer, and
wherein the combined layer extends from the exposed surface to a point at a constant length away from the exposed surface in a direction perpendicular to the exposed surface.

6. The heat insulator according to claim 5, wherein the constant length is a length not greater than a thickness of the heat insulator.

7. The heat insulator according to claim 4, wherein all or part of the combined layer faces the exposed surface.

8. The heat insulator according to claim 1,
wherein the at least one support layer wraps the fiber layer and is stacked on or above one surface of the fiber layer, and
wherein stacked portions of the at least one support layer are welded together to become a welded portion of the at least one support layer.

9. The heat insulator according to claim 1, wherein combined layer exists in a planar manner.

10. A heat insulator, comprising:
a fiber layer comprising a nonwoven fabric and silica aerogels, the nonwoven fabric being formed from fibers, the silica aerogels being supported by the nonwoven fabric and existing throughout the nonwoven fabric;
at least one support layer comprising polyethylene having a melting point lower than a melting point of the fibers, and disposed on or above at least one surface of the fiber layer; and
a combined layer resulting from the support layer welded with the fiber layer, wherein a part of the polyethylene is integrated into the fiber layer and penetrates between the fibers of the nonwoven fabric,
wherein the support layer wraps the fiber layer and includes a weld portion where end portions of the support layer are welded together,
wherein the welded portion exists in a planar manner,
wherein the combined layer is not disposed on an entire area between the fiber layer and the at least one support layer, but is disposed in a partial area between the fiber layer and the at least one support layer, and
wherein the partial area exists at an end portion of the heat insulator.

11. The heat insulator according to claim 4,
wherein the combined layer exists in a part of an interface between the fiber layer and the at least one support layer,
wherein the combined layer has (1) a length extending from a first end of the exposed surface to a second end of the exposed surface, and (2) a width extending in a direction perpendicular to the exposed surface, and
wherein the width of the combined layer is (1) same from the first end of the exposed surface to the second end of the exposed surface, and (2) less than a thickness of the heat insulator.

12. A heat insulator, comprising:
a fiber layer comprising a nonwoven fabric and silica aerogels, the nonwoven fabric being formed from fibers, the silica aerogels being supported by the nonwoven fabric and existing throughout the nonwoven fabric;
at least one support layer comprising polyethylene having a melting point lower than a melting point of the fibers, and disposed on or above at least one surface of the fiber layer;
a first combined layer resulting from the at least one support layer welded with the fiber layer, wherein a first part of the polyethylene is integrated into the fiber layer and penetrates between the fibers of the nonwoven fabric, and wherein the first combined layer is disposed in a first partial area between the fiber layer and the at least one support layer; and
a second combined layer resulting from the at least one support layer welded with fiber layer, wherein a second part of the polyethylene is integrated into the fiber layer and penetrates between the fibers of the nonwoven fabric, and wherein the second combined layer is disposed in a second partial area between the fiber layer and the at least one support layer,
wherein the first combined layer is not disposed on an entire area between the fiber layer and the at least one support layer, but is disposed in the first partial area between the fiber layer and the at least one support layer, and
wherein the second combined layer is not disposed on an entire area between the fiber layer and the at least one support layer, but is disposed in the second partial area between the fiber layer and the at least one support layer.

13. The heat insulator according to claim 12,
wherein the first partial area is disposed at one end of the heat insulator and the second partial area is disposed at another end of the heat insulator.

* * * * *